United States Patent [19]

Hyland, Jr.

[11] Patent Number: 4,688,427
[45] Date of Patent: Aug. 25, 1987

[54] DYNAMIC BALANCE TESTER

[75] Inventor: James F. Hyland, Jr., Farmington, Conn.

[73] Assignee: United Technologies Corporation, Hartford, Conn.

[21] Appl. No.: 850,991

[22] Filed: Apr. 11, 1986

[51] Int. Cl.[4] ............................................. G01M 1/16
[52] U.S. Cl. ..................................................... 73/460
[58] Field of Search ................ 73/460, 461, 462, 471, 73/472, 473

[56] References Cited

U.S. PATENT DOCUMENTS

| | | | |
|---|---|---|---|
| 2,946,224 | 7/1960 | Yamaguchi | 73/461 |
| 3,207,979 | 9/1965 | Perkins | 73/462 |
| 3,727,027 | 4/1973 | Kaiser et al. | 73/461 |
| 4,233,846 | 11/1980 | Taylor | 73/460 |
| 4,281,548 | 8/1981 | Kober | 73/593 |
| 4,286,467 | 9/1981 | Kober | 73/460 |
| 4,387,596 | 6/1983 | Fenkner et al. | 73/593 |
| 4,467,639 | 8/1984 | Bush | 73/460 |
| 4,546,644 | 10/1985 | Beny et al. | 73/461 |

OTHER PUBLICATIONS

H. Goldstein, *Classical Mechanics*, Addison-Wesley, Reading, Mass., 1965, pp. 159–163.

Primary Examiner—John Chapman
Attorney, Agent, or Firm—Troxell K. Snyder

[57] ABSTRACT

An apparatus for measuring the dynamic imbalance in a bearing ball (10) includes a support member (32) having a concave surface (34) for receiving and positionally retaining the ball (10). A cushion of compressed gas is established between the concave surface (34) and the ball (10) by a plurality of flow passages (36) disposed in the support member (32). Rotating motion is imparted to the ball (10) by an intermittent gas jet (46) and the subsequent motion (28) of the axis of rotation (22) resulting from the presence of any dynamic imbalance within the sphere (10) is measured (68, 70, 72).

5 Claims, 7 Drawing Figures

DYNAMIC BALANCE TESTER

FIELD OF THE INVENTION

The present invention pertains to an apparatus for testing the dynamic balance of a rotating object, and more particularly, to an apparatus for testing the dynamic balance of a spherical body such as a bearing ball or the like.

BACKGROUND

The existence of rotational imbalance in spinning components is typically an undesirable situation. The prior art is replete with various methods and devices for determining and/or correcting such imbalance. These devices are generally divisible into two categories, those for determining static imbalance and those for determining dynamic imbalance.

Static imbalance in any solid article is the result of an asymmetric mass distribution within the article, and may be determined by simply balancing the article at its center point. Dynamic imbalance, on the other hand, may occur in an object having a symmetrical mass distribution, occurring when the primary inertial axis of the rotating object is not colinear with the axis of rotation. The effects of a dynamic imbalance in a statically balanced component are thus detectable only during rotation.

The use of ball bearings to support rotating shafts or other moving components is well known throughout the modern industrial world. In a typical ball bearing arrangement for a rotating shaft, a plurality of spherical bearing balls are disposed between concentric inner and outer bearing races for providing rolling contact between the bearing support and the rotating shaft. For high speed, high load applications, dimensional uniformity of the individual bearing balls is a necessity, requiring careful manufacture and close inspection. Such measures have resulted in individual bearing balls with consistently uniform weight, diameter, surface finish, etc.

Despite the close tolerances being met by today's manufacturers, individual balls still continue to wear and degrade unevenly under certain high demand applications. It has been theorized that such wear is the result of the existence of dynamic imbalance in individual bearing balls. A dynamically unbalanced ball tends to roll about an axis coincident with the ball's principal moment of inertia, thus causing a particular circumferential portion of the individual ball to receive the bulk of the contact between the ball and associated races. A dynamically balanced ball would tend to rotate randomly, distributing contact over its entire surface.

Prior art dynamic test machines have typically been directed toward balancing elongated roller bearings, shafts, and other non-spherical rotating components. What is needed is a device for evaluating the degree of dynamic imbalance in a geometrically symmetrical spherical body.

SUMMARY OF THE INVENTION

According to the present invention, an apparatus is provided for measuring both the location and magnitude of any dynamic imbalance present in a spherical body, such as a bearing ball or the like. In the preferred embodiment, the spherical body is received within a concave, semi-spherical cup, wherein the sphere is both supported and restrained positionally. A substantially frictionless relationship is created between the surface of the sphere and the supporting cup which allows the sphere to rotate independent of outside influence.

Measurement of the dynamic imbalance of the spherical body is initiated by placing the sphere within the "frictionless" supporting member and accelerating it to a high angular speed about a particular axis with an intermittent gas jet or other spinning up means. The rotating body is then released from the spin up means and left to continue spinning freely, allowing the axis of rotation to describe a nutation cone. The present invention further provides means for monitoring the angular size and period of the axis nutation for respectively determining the location and magnitude of any nonuniformity in the moments of inertia of the sphere.

It is therefore an object of the present invention to measure the magnitude and position of a dynamic mass imbalance in a spherical body.

It is further an object of the present invention to provide frictionless means for supporting and positionally restraining said body while giving said body complete rotational freedom.

It is still further an object of the present invention to provide releasable means for spinning up said body to a high angular velocity about a preselected axis of rotation, the body subsequently being released from the spinning means and moving solely under the influence of rotation-induced forces.

It is still further an object of the present invention to provide means for monitoring the movement of the rotation axis of the freely rotating spherical body, whereby both the location and magnitude of any mass imbalance present in said body are determined.

BEST MODE FOR CARRYING OUT THE INVENTION

Before discussing the various embodiments of the test device according to the present invention, a brief presentation of the nature and effect of dynamic imbalance in a spherical body is in order. As the physics of motion of spherical bodies is well known, the following discussion is intended only to define the geometry and terms used to describe and claim the subject invention.

Figure 1:
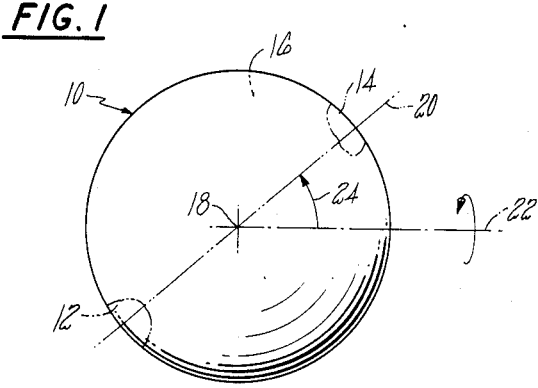
FIG. 1 shows a schematic view of a dynamically imbalanced sphere.

FIG. 1 shows a schematic view of a spherical body 10 which is dynamically unbalanced. For a solid spherical ball, such imbalance may be simply generalized as being due to the occurrence of two regions 12, 14 of increased mass as compared to the otherwise homogenous ball interior 16.

As will be appreciated from FIG. 1, ball 10 is statically balanced with regard to the ball center 18, the increased mass regions 12, 14 being symmetrically disposed with respect thereto. It will further be appreciated that the principal (i.e., minimum) moment of inertia of the ball 10 is coincident with a line 20 passing through the increased mass regions 12, 14.

Rotation of the dynamically imbalanced ball 10 about an axis 22 which is not coincident with that of the principal moment of inertia 20 results in a wobbling or precessional motion, termed "nutation", which is a function of both the angle 24 between the principal moment axis 20 and the axis of rotation 22, and the difference in magnitude between the principal moment 20 and the remaining moments taken about axes orthogonal thereto (not shown).

Figure 2:
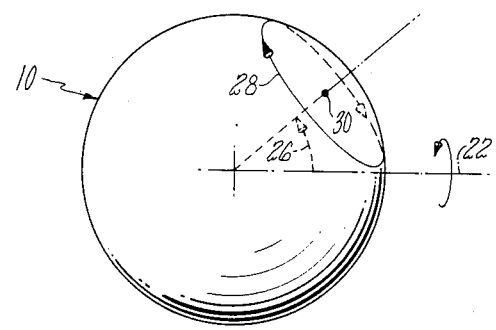
FIG. 2 shows the nutating motion experienced by the sphere of FIG. 1 during rotation.

FIG. 2 shows the motion described by the ball 10 of FIG. 1, if allowed to rotate free of outside influence. The axis of rotation 22 will describe cone shaped loci, having an internal half angle 26 which is identical to the angle 24 between the principal moment axis 20 and the axis of rotation 22. If observed at the surface of the ball 10, the axis of rotation 22 will appear to describe a circular path 28 about a central point 30. The angular velocity of the nutation of the rotational axis 22 is related to the magnitude of the difference between the moment taken about axis 20 and the moments taken orthogonal thereto by the relationship:

$$\Delta I/I = \Omega/\omega \cos\beta \qquad (Eq. A)$$

wherein,

I = the orthogonal moment of inertia $\Delta I$ = the absolute value of the difference between the principal moment and the orthogonal moment $\Omega$ = the angular velocity of the nutation of rotational axis 22

$\omega$ = the angular velocity of the rotating body about axis 22, and $\beta$ = the half angle of the observed nutation cone 26, also the angle 24 between the principal moment axis 20 and the axis of rotation 22

As can be seen from this relationship, for a ball rotating with a given angular speed, the angular velocity of nutation of the axis of rotation 22 varies directly with the magnitude of the difference between the principal moment of inertia and the corresponding orthogonal moments. The degree of dynamic imbalance present in a spherical body is thus completely determined from these three parameters: $\Omega$, $\omega$, $\beta$.

Figure 3:
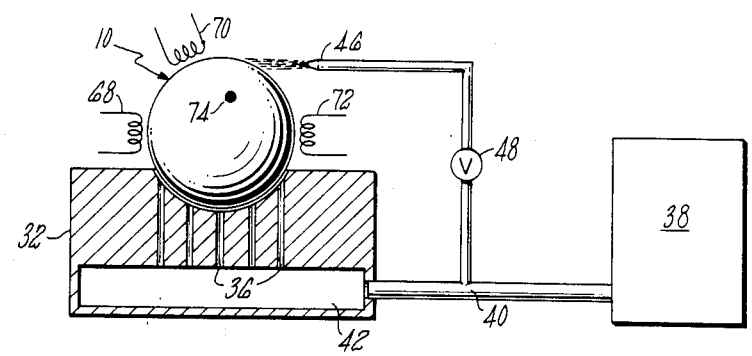
FIG. 3 shows the preferred embodiment of the testing device according to the present invention.

FIG. 3 shows an apparatus for effecting the imbalance measurement described by the preceding equation. The apparatus provides a supporting means in the form of a member 32 having a concave, cup shaped surface 34 wherein the ball 10 is accepted for testing. In the preferred embodiment, a substantially frictionless relationship between the cup surface 34 and the ball 10 is created by establishing a cushion of gas therebetween. This cushion may be generated by means of a plurality of flow passages 36 providing fluid communication between the cup surface 34 and a source of pressurized gas such as a pressure tank 38.

Figure 7:
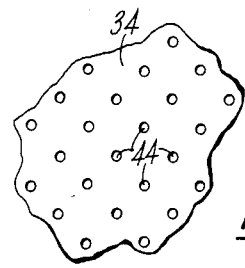
FIG. 7 shows a detailed view of the gas cushion support of the preferred embodiment.

As shown in FIG. 3, pressurized gas flows from the pressure tank 38 via conduits 40, entering a plenum 42 whence it is distributed into the individual flow passages 36. FIG. 7 shows a detailed view of one possible arrangement of flow openings 44 in the cup surface 34.

The sphere, or bearing ball, 10 is thus supported and positionally restrained by member 32 and the semispherical cup surface 34. Dynamic balance testing is initiated in the preferred embodiment by spinning up the ball 10 to a desired angular velocity by means of a gas jet 46 directed so as to impinge tangentially on the ball surface as shown in FIG. 3. The jet 46 is controllable by means of a valve 48, allowing the angular accelerating influence of the gas jet to be completely removed from the ball 10 upon achievement of the desired rotational speed.

Once released from the spin up means 46, the motion of the ball 10, and in particular the angle and speed of nutation of the axis of rotation 22 is monitored. In the preferred embodiment this monitoring is accomplished by magnetic triangulation using three magnetic pickup coils 68, 70, 72 disposed closely about the spinning ball 10 which has been at least temporarily magnetized.

The moving magnetic field induces periodic electrical currents in the individual coils 68, 70, 72 which are detected and correlated to determining the direction and nutation of the axis of rotation. An alternative monitoring method includes placing one or more lightweight magnetic or radioactive film spots 74 about the surface of the ball 10. Appropriate detectors would note the passing of the individual film spots with the detector output being correlated for imbalance analysis.

Figure 4:
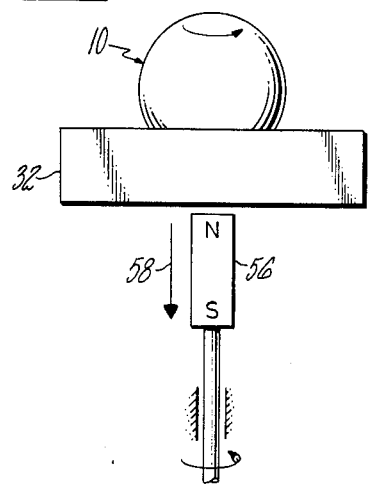
FIG. 4 shows an alternative means for spinning up the measured spherical body.

FIG. 4 shows an alternative means for spinning up the ball 10 supported in the support member 32. In the embodiment of FIG. 4, a slight magnetic charge is imparted to the ball 10 which is then acted upon by a rotatable magnet 56 shown schematically. After accelerating the ball 10 to the desired angular velocity, magnet 56 may be withdrawn 58 as shown, releasing the ball 10 and allowing it to rotate and nutate freely.

Figure 5:
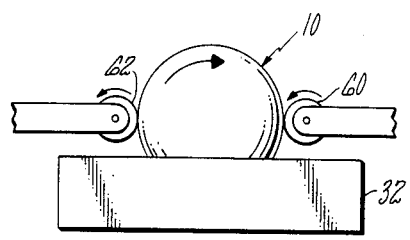
FIG. 5 shows another alternative means for spinning up the spherical body.

FIG. 5 shows still another embodiment wherein a pair of rotating wheels 60, 62 are moved horizontally into engagement with the ball 10. After accelerating the ball 10 to the desired rotational speed, the rotating wheels 60, 62 are withdrawn from contact with the ball 10.

Figure 6:
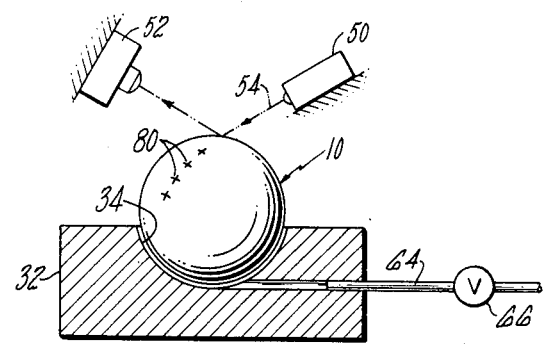
FIG. 6 shows a further alternative means for spinning up the spherical body.

FIG. 6 shows both an alternative means for spinning up the ball 10 to the desired angular velocity as well as an alternative means for monitoring the nutation of the axis of rotation 22. In FIG. 6, a conduit 64 is disposed in the support member 32 and oriented so as to direct a jet of gas obliquely against the surface of the ball 10 within the air cushion formed against the cup surface 34. The gas jet issuing from conduit 64 is controlled by a valve 66 which is closed after the ball 10 has been accelerated to the desired rotational speed.

In this embodiment monitoring is accomplished by optical means, including a source of light energy 50 and a receiver 52. During operation, a beam of light energy 54 is directed against the surface of the ball 10 and reflected into the receiver 52 wherein it is interpreted and recorded.

Although any type of light energy suitable for generating the desired data may be used, it is preferable to employ a focused, coherent beam of laser light for maximum accuracy. It may also be necessary to provide a reflective coating or indicia 80 on the surface of the ball 10 in order to indicate arbitrary reference points to the detection means 52.

Once the magnitude of the dynamic imbalance of a particular bearing ball or spherical body has been determined with the apparatus according to the present invention, it is possible to sort the tested spheres accordingly, reserving those with the least imbalance for high speed, high demand applications. An alternative application would be to test a representative sample of a large quantity of bearing balls to determine the range of dynamic imbalance present in a given production run.

Referring again to the equation of motion presented above (Eq. A), it will be apparent that the axis of rotation will be observed to nutate as long as the angle between the axis of rotation 22 and the axis of the principal moment 20 is neither 0° nor 90°, 0° generating a nutation cone of infinitesimal cross section and 90° resulting in the period of the nutation approaching infinity. It is therefore necessary for a thorough understanding of the best mode of practicing the present invention to emphasize that the lack of any observed nutation in a particular spinning sphere 10 may be the result of the fortuitous orientation of the axis of the principal moment and the axis of rotation, rather than the non-existence of any dynamic imbalance in the spherical body itself. An effective procedure for choosing between these two possibilities is to respin the spherical body about a different axis of rotation, preferably disposed at a 45° angle with the original axis, thereby verifying the dynamic balance or unbalance of the body by the respective absence or presence of nutation of the second axis of rotation.

Although disclosed and pictured illustratively in the foregoing specification and the appended drawing figures, it is to be understood that there are numerous additional embodiments and arrangements falling within the scope of the present invention for providing a dynamic balance test apparatus for spherical bodies. The foregoing discussion should thus not be construed in a limiting sense, but rather as a means for shedding an interpretative light on the appended claims.

I claim:

1. An apparatus for measuring dynamic imbalance in a bearing ball, comprising:
    means for supporting said ball while simultaneously permitting the free rotation thereof;
    means for positionally retaining the geometric center of said ball in a predetermined location;
    means for spinning up said ball about a predetermined axis of rotation, the spinning up means further being disengageable from the rotating ball for establishing the free rotation thereof; and
    means for monitoring the nutating motion of the axis of rotation of the freely rotating ball, the monitoring means including means for optically measuring the angle and period of the nutation of the rotation axis,
    whereby the magnitude of the angle of nutation of the rotation axis is indicative of the location of any dynamic imbalance within said ball, and the period of the nutation of the rotation axis is indicative of the magnitude of the dynamic imbalance.

2. The measuring apparatus as recited in claim 1, wherein the supporting means and retaining means further comprise
    a concave, semi-spherical surface for receiving said ball therewithin, the surface further having a plurality of holes disposed therein for admitting a flow of gas between said ball and the surface for establishing a low friction gas cushion therebetween.

3. The measuring apparatus as recited in claim 1, wherein the spinning up means includes
    a controllable high velocity gas jet oriented to impinge obliquely on the surface of said ball.

4. The measuring apparatus as recited in claim 1, wherein the optical measuring means further comprises
    a laser oriented to direct a beam of light energy against the rotating ball.

5. The measuring apparatus as recited in claim 1, wherein the spinning up means includes
    a pair of rotating members for selectively engaging the surface of said ball for imparting rotating motion thereto.

* * * * *